United States Patent
Saito

(10) Patent No.: US 10,230,893 B2
(45) Date of Patent: Mar. 12, 2019

(54) LENS APPARATUS AND IMAGE CAPTURING APPARATUS

(71) Applicant: CANON KABUSHIKI KAISHA, Tokyo (JP)

(72) Inventor: Naoki Saito, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 116 days.

(21) Appl. No.: 15/374,024

(22) Filed: Dec. 9, 2016

(65) Prior Publication Data

US 2017/0180638 A1 Jun. 22, 2017

(30) Foreign Application Priority Data

Dec. 17, 2015 (JP) .................. 2015-246312

(51) Int. Cl.
*H04N 5/232* (2006.01)
*G02B 7/14* (2006.01)
*H04N 5/225* (2006.01)

(52) U.S. Cl.
CPC .......... *H04N 5/23225* (2013.01); *G02B 7/14* (2013.01); *H04N 5/2254* (2013.01); *H04N 5/23209* (2013.01)

(58) Field of Classification Search
CPC ............. H04N 5/2254; H04N 5/23209; H04N 5/23225; G02B 7/14
See application file for complete search history.

(56) References Cited

U.S. PATENT DOCUMENTS

| 7,750,940 B2 * | 7/2010 | Tanaka ............... H04N 1/00962 348/207.99 |
| 7,783,182 B2 | 8/2010 | Tokiwa et al. |
| 8,403,574 B2 | 3/2013 | Okada |
| 8,412,034 B2 | 4/2013 | Okada |

(Continued)

FOREIGN PATENT DOCUMENTS

| CN | 104950556 A | 9/2015 |
| JP | 2005078343 A | 3/2005 |

(Continued)

OTHER PUBLICATIONS

Office Action issued in Japanese Appln. No. 2015-246312 dated May 8, 2018. English Translation provided.

*Primary Examiner* — Lin Ye
*Assistant Examiner* — Chriss S Yoder, III
(74) *Attorney, Agent, or Firm* — Rossi, Kimms & McDowell LLP

(57) ABSTRACT

A lens apparatus is attachable to and detachable from an image capturing apparatus and configured to communicate with the image capturing apparatus. An accessory is attachable to and detachable from the lens apparatus and configured to communicate with the lens apparatus. The lens apparatus includes a determiner configured to determine whether update data is used for the lens apparatus or the accessory, the update data being transmittable from the image capturing apparatus and used to update stored data stored in the lens apparatus or the accessory, and a controller configured to transmit the update data to the accessory received from the image capturing apparatus when the determiner determines that the update data is used for the accessory.

4 Claims, 5 Drawing Sheets

(56) References Cited

U.S. PATENT DOCUMENTS

| | | | |
|---|---|---|---|
| 10,001,697 B2* | 6/2018 | Seki | G03B 17/565 |
| 2005/0057991 A1 | 3/2005 | Kosugiyama et al. | |
| 2005/0237417 A1* | 10/2005 | Miyasaka | G02B 7/34 |
| | | | 348/335 |
| 2006/0092312 A1 | 5/2006 | Tanaka | |
| 2011/0206359 A1* | 8/2011 | Nishimura | G03B 3/10 |
| | | | 396/111 |
| 2011/0229115 A1 | 9/2011 | Okada | |
| 2011/0293255 A1* | 12/2011 | Kikuchi | G02B 7/102 |
| | | | 396/80 |
| 2012/0033955 A1* | 2/2012 | Okada | G02B 7/14 |
| | | | 396/71 |

FOREIGN PATENT DOCUMENTS

| | | |
|---|---|---|
| JP | 2006121418 A | 5/2006 |
| JP | 2006171392 A | 6/2006 |
| JP | 2007003646 A | 1/2007 |
| JP | 2008116660 A | 5/2008 |
| JP | 2010263312 A | 11/2010 |
| JP | 2011019093 A | 1/2011 |
| JP | 2011197094 A | 10/2011 |
| JP | 2011197095 A | 10/2011 |
| JP | 2013156604 A | 8/2013 |
| JP | 2015184660 A | 10/2015 |

\* cited by examiner

LENS APPARATUS AND IMAGE CAPTURING APPARATUS

BACKGROUND OF THE INVENTION

Field of the Invention

The present invention relates to an image capturing system that can rewrite a program and other data for an accessory attached to a lens apparatus, through an image capturing apparatus to which the lens apparatus is attached.

Description of the Related Art

Japanese Patent Laid-Open No. ("JP") 2011-197094 discloses the above image capturing system, which cuts a communication from the image capturing apparatus to the lens apparatus when the image capturing apparatus rewrites data stored in a memory in an accessory attached between the lens apparatus and the image capturing apparatus. JP 2011-197095 discloses an image capturing system that includes an image capturing apparatus to which a pseudo lens apparatus having no communication function with the image capturing apparatus can be connected via an accessory instead of the normal lens apparatus. In this image capturing system, the pseudo lens apparatus is attached to the image capturing apparatus via the accessory and the power supply starts from the image capturing apparatus to the accessory. When the accessory receives a command for rewriting from the image capturing apparatus data a predetermined time period after the power supply starts, the accessory rewrites the data stored in its memory.

Since the accessory is directly connected with the image capturing apparatus in each of the image capturing systems disclosed in JPs 2011-197094 and 2011-197095, the data stored in the accessory can be easily rewritten by the communication between the image capturing apparatus and the accessory.

This is not the case when the accessory is connected to the lens apparatus but is not directly connected to the image capturing apparatus. It is difficult to rewrite the data stored in the accessory from the image capturing apparatus, since the image capturing apparatus cannot directly communicate with the accessory.

SUMMARY OF THE INVENTION

The present invention provides a lens apparatus, an image capturing apparatus, and an accessory, which can build an image capturing system configured to easily rewrite data stored in the accessory from the image capturing apparatus, where the accessory is not directly connected to the image capturing apparatus.

A lens apparatus according to one aspect of the present invention is attachable to and detachable from an image capturing apparatus and configured to communicate with the image capturing apparatus. An accessory is attachable to and detachable from the lens apparatus and configured to communicate with the lens apparatus. The lens apparatus includes a determiner configured to determine whether update data is used for the lens apparatus or the accessory, the update data being transmittable from the image capturing apparatus and used to update stored data stored in the lens apparatus or the accessory, and a controller configured to transmit the update data to the accessory received from the image capturing apparatus when the determiner determines that the update data is used for the accessory.

Further features of the present invention will become apparent from the following description of exemplary embodiments with reference to the attached drawings.

DESCRIPTION OF THE EMBODIMENTS

Referring now to the accompanying drawings, a description will be given of the embodiments of the present invention.

First Embodiment

Figure 1:
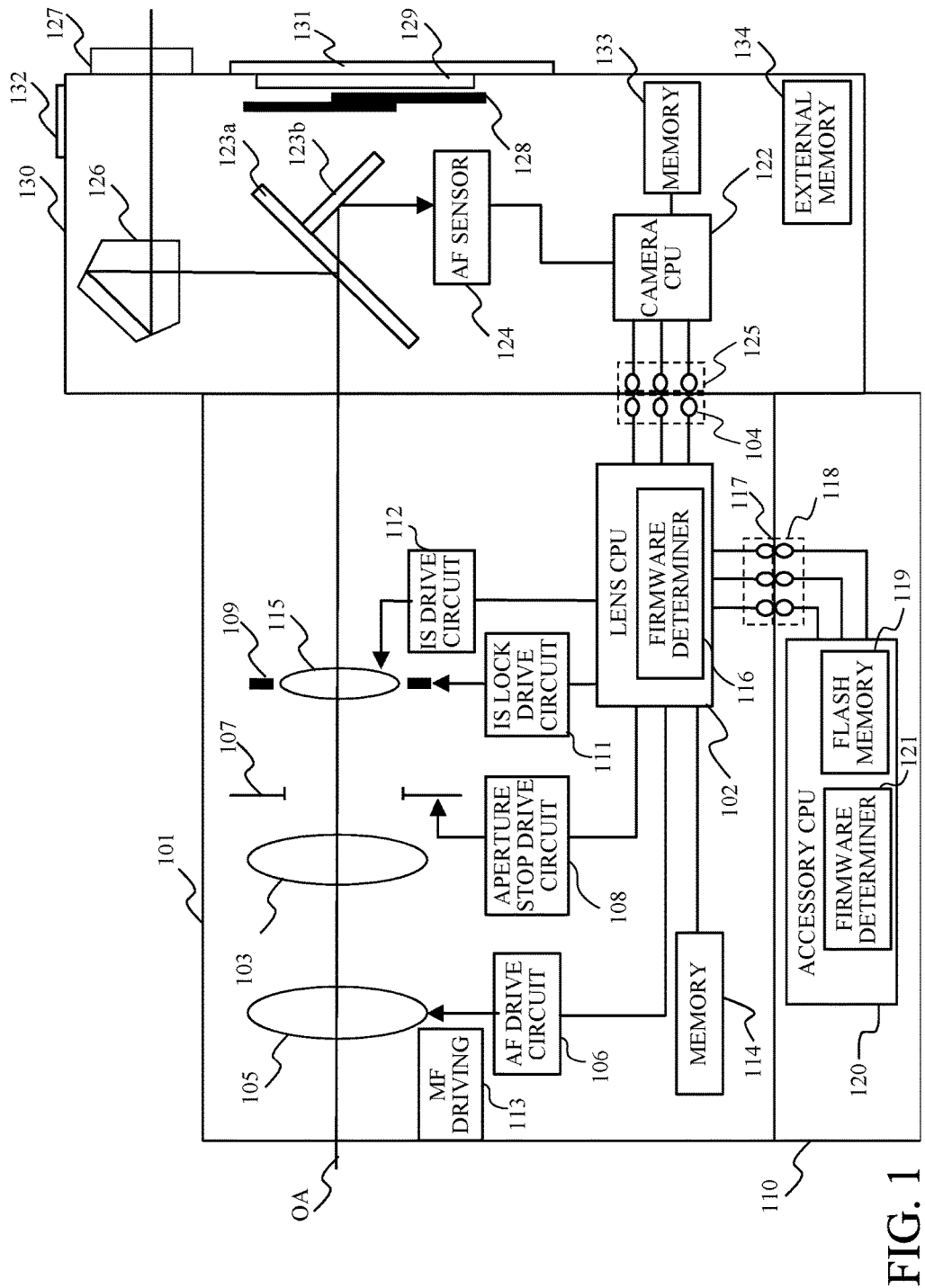
FIG. 1 is a block diagram of a configuration of an image capturing system according to a first embodiment of the present invention.

FIG. 1 illustrates a configuration of an image capturing system according to a first embodiment of the present invention. The image capturing system includes an interchangeable lens (lens apparatus) 101, a digital camera (image capturing apparatus referred to as a "camera body" hereinafter) 130 to which the interchangeable lens 101 is detachably attached, and a lens accessory 110 detachably attached to the interchangeable lens 101. The lens accessory 110 is not attached to the digital camera 130 and cannot directly communicate with the lens digital camera 130.

The interchangeable lens 101 is attached to the camera body 130 via an unillustrated mount. The camera body 130 and the interchangeable lens 101 can communicate a variety of data and various types of information with each other via communication terminals 125 and 104. The interchangeable 101 is supplied with power via power terminals among the communication terminals 125 and 104 from the camera body 130.

The interchangeable lens 101 stores, as unique information, optical information (a focal length, an F-number, a focus sensitivity, a focus correction amount, etc.) and characteristic information, and can send the information to the camera body 130. When the lens accessory 110 is attached to the interchangeable lens 101, the characteristic information of the lens accessory 110 may be sent to the camera body 130. The "optical information" means optically unique information, such as a focus lens sensitivity and a focus correction amount information, which changes in accordance with a zoom, focus, F-number, etc. The "characteristic information" is unique information that does not basically change based on the state. For example, the characteristic information includes optical identification information (lens ID and accessory ID) used to identify a machine type and a manufacture number of the interchangeable lens and the lens accessory, a maximum communication speed, an open F-number, whether the interchangeable lens has a zoom lens, whether autofocus ("AF") is available, an image height, etc.

Similarly, the interchangeable lens 101 receives the unique information of the camera body, such as a type, a name, and a camera control program version of the camera body 130. When the camera body 130 obtains the optical information and characteristic information unique to the interchangeable lens 101, the camera body 130 can properly perform the AF, auto exposure ("AE"), and an image correction.

The interchangeable lens 101 and the camera body 130 can communicate other information, such as each operation state, each setting state, a request command (transmission request) of various types of information, and a driving command.

The interchangeable lens 101 includes an image capturing optical system, various types of driving systems, a lens CPU 102, and a lens memory 114. The image capturing optical system forms an optical image of an object, and includes, in order from the object side along the optical axis OA, a focus lens 105, a magnification-varying lens 103, an aperture stop (diaphragm) 107, and an image stabilization lens (image-blur correction lens) 115.

The focus lens 105 is moved along an optical axis OA (referred to as an "optical axis direction" hereinafter) by an unillustrated focus actuator, such as a stepping motor, for focusing. In the AF, the CPU 102 controls the focus actuator via a focus drive circuit 106. In the manual focus ("MF"), the focus lens 105 is moved in the optical axis direction when the user operates a MF driver 113, such as a focus operation ring, by his hand.

The magnification-varying ring 103 is moved in the optical axis direction by an unillustrated zoom actuator and varies a focal length of the image capturing optical system (for magnification variations).

An aperture stop blade of the aperture stop 107 is driven by the aperture stop drive circuit 108. Thereby, the aperture stop aperture diameter is changed, and a light quantity incident upon the image sensor 129 in the camera body 130 is adjusted.

The image stabilization lens 115 stabilizes an image when moved or shifted in a direction orthogonal to the optical axis OA by the image stabilization (IS) drive circuit (image-blur correction drive circuit) 112 in accordance with a camera vibration, such as manual vibrations.

The lens CPU 102 includes a microcomputer, controls an operation of each component in the interchangeable lens 101, and can communicate with a camera CPU (controller) 122. The lens CPU 102 stores optical information and characteristic information unique to the interchangeable lens 101, a lens firmware as a lens control program and data necessary for the control in an unillustrated internal flash memory. The optical information and characteristic information of the interchangeable lens 101 may be stored in the lens memory 114.

A firmware determiner 116 in the lens CPU 102 determines firmware update data used to update data stored in the internal flash memory in the lens CPU 102, and determines whether the firmware update data is to be transmitted to the lens accessory 110.

The interchangeable lens 101 is provided with an AF/MF switch through which a user can select the AF and MF. A state of the AF/MF switch is also communicated to the camera body 130 via the communication terminals 104 and 125.

The lens accessory 110 includes an unillustrated actuator and an accessory CPU 120. The accessory CPU 120 includes a microcomputer, controls an operation of each component in the lens accessory 110, and communicates with the interchangeable lens 101 via the communication terminals 117 and 118. The flash memory 119 provided in the accessory CPU 120 stores an accessory firmware as an accessory control program for controlling the lens accessory 110, data necessary for the control, a communication program used to control the communication with the interchangeable lens 101, etc. A firmware determiner 121 in the accessory CPU 120 determines whether the firmware update data used to update data stored in the flash memory 119.

The camera body 130 includes a camera CPU 122, a camera memory 133, a main mirror 123a, a sub mirror 123b, a viewfinder optical system (prism 126 and an eyepiece 127), a shutter 128, an image sensor 129, a camera display (display unit) 131, and a release button 132.

The main mirror 123a and the sub mirror 123b are rotatably configured between a mirror down state disposed on the optical axis OA illustrated in FIG. 1 and an unillustrated mirror up state that is a retreat state from the optical axis OA. The main mirror 123a includes a half-mirror, reflects part of the light from the object to the prism 126 (viewfinder optical system) in the mirror down state, enables the user to observe the object image, and transmits remaining light to the sub mirror 123b. The sub mirror 123b reflects the light from the main mirror 123a to an AF sensor 124. While the camera body 130 in this embodiment is a single-lens reflex camera that includes the main mirror 123a and the sub mirror 123b, the present invention is applicable to a mirrorless camera that has no main mirror or sub mirror.

The AF sensor 124 photoelectrically converts a pair of object images formed by light from the sub mirror 123b (or the image capturing optical system), and detects a phase difference between the pair of generated image signals and consequently a focus state of the image capturing optical system (a focus detection in accordance with a phase difference detection method). The camera CPU 122 performs the phase difference AF based on the focus detection result by the AF sensor 124. When the camera body 130 is the mirrorless camera, the phase difference AF utilizes a signal from pixels in part of the image sensor.

The camera CPU 122 includes a microcomputer, controls an operation of each component in the camera body 130, and transmits various types of commands to the lens CPU 102 by communicating with the lens CPU 102. The camera memory 133 stores unique information (optical information and characteristic information) of the interchangeable lens 101 received from the interchangeable lens 101, and data used for various types of image capturing modes.

The camera CPU 122 calculates a drive amount of the focus lens 105 for an in-focus state based on the detection result by the AF sensor 124 when the AF is selected. The CPU 122 sends the calculated drive amount of the focus lens 105 to the CPU 102, and the CPU 102 controls the lens drive circuit 106 in accordance with the drive amount of the focus lens 105 and moves the focus lens 105 to the in-focus position. On the other hand, when the MF is selected, the user operates the MF driver 113 and moves the focus lens 105 to an arbitrary position designated by the user.

When the release button 132 is half-pressed, a SW1 signal is output to the camera CPU 122 from the unillustrated switch circuit that has detected it. When the release button 132 is fully pressed, a SW2 signal is output from the switch circuit to the camera CPU 122.

The camera CPU 122 starts an image capturing preparation operation (AF, photometry, etc.) in response to the SW1 signal, and starts image capturing (image acquisition/recording) in response to the SW2 signal.

An unillustrated photometric timer turns on in response to the SW1 signal. When the photometric timer turns on, a viewfinder display unit in the viewfinder optical system and the camera display 131 display a shutter speed, an F-number, an exposure level, etc. calculated based on the photometric result. The photometric timer is updated in accordance with a continuous input from the SW1 signal and an operation of the operation unit, such as an unillustrated electronic dial and an AE lock button.

In response to the SW1 signal, the camera CPU 122 calculates an aperture stop drive amount based on the photometric result by the unillustrated photometric sensor or an F-number set by the user, and sends the calculation result to the lens CPU 102. The lens CPU 102 controls the aperture stop drive circuit 108 in accordance with the received aperture stop drive amount, and drives the aperture stop 107.

In response to the SW1 signal, the camera CPU 122 transmits an image stabilization start command to the lens CPU 102. The lens CPU 102 controls the image stabilization drive circuit 112 when receiving the image stabilization start command, so as to hold the image stabilization lens 115 at a shift center position. Next, the camera CPU 122 controls the IS lock drive circuit 111, drives the lock mechanism 109, and releases the lock state that prevents the image stabilization lens 115 form shifting. Thereafter, the lens CPU 102 controls the image stabilization drive circuit 112 in accordance with the detection result of the camera vibration by the unillustrated vibration detection circuit, shifts the image stabilization lens 115, and corrects the image blur.

In response to the SW2 signal, the camera CPU 122 drives the shutter 128 between the main mirror 123a and the image sensor 129, leads the light flux from the image capturing optical system to the image sensor 129 for image capturing. The image sensor 129 includes a photoelectric conversion element, such as a CCD sensor and a CMOS sensor. The camera CPU 122 generates image data (captured image) based on the output from the image sensor 129, and records it in an external memory 134. Herein, the generated captured image is a still image when a still image capturing mode is selected by an unillustrated mode selection switch, and is a motion image when a motion image capturing mode is selected. In addition, a recording start button may be separately provided and recording of the motion image may be started when the recording start button is operated.

When the motion image capturing mode is selected, the main and sub mirrors 123a and 123b are set to the mirror up state and a live-view mode is set which does not record anything although the image is displayed on the camera display 131.

The camera display 131 includes an LCD panel, and displays a still image, a motion image, and other information. When the camera display 131 has a touch panel function, the user can select an image capturing mode and a variety of menu items by touching the screen with his finger.

The external memory 134 is a semiconductor memory, and detachably attached to the camera body 130. The external memory 134 is connected to the camera CPU 122, and stores data of captured image, the camera control program for controlling the camera body 130, the lens control program for controlling the interchangeable lens 101, and the accessory control program for controlling the lens accessory 110. The data stored in the external memory 134 can be read and written by the camera CPU 122.

The camera CPU 122 serves as a data acquirer and a controller in the camera body 130. The lens CPU 102 serves as a controller in the interchangeable lens 101. The accessory CPU 120 serves as a controller in the lens accessory 110.

A description will be given of the firmware update method for the lens accessory 110 in the thus constituted image capturing system, with reference to FIGS. 2A to 2C. Now assume that the interchangeable lens 101 is attached to the camera body 130 and the lens accessory 110 is attached to the interchangeable lens 101.

Figure 2:
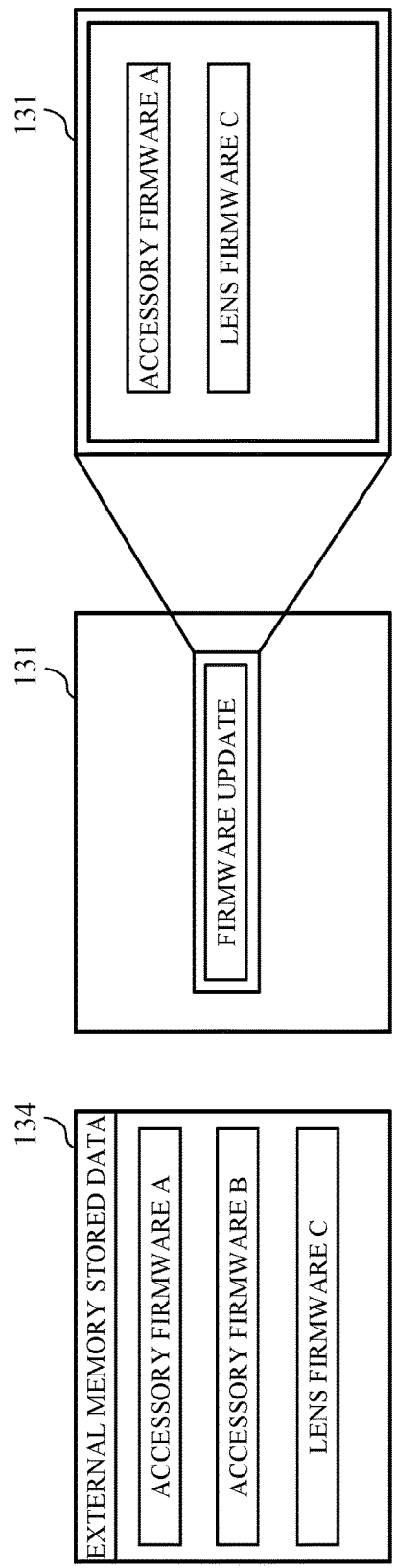
FIGS. 2A to 2C are views illustrating a firmware (software) update user interface ("UI") in the image capturing system according to the first embodiment.

FIG. 2A illustrates various types of firmware update data (update data) stored in the external memory 134 provided in the camera body 130. The firmware update data includes accessory firmwares A and B as firmware update data for the lens accessory 110, and a lens firmware C as a firmware update data for the lens accessory 110. The accessory firmwares A and B have different firmware versions, the accessory firmware A has a version newer than that of the stored accessory firmware B written in the current lens accessory 110. The lens firmware C has a version newer than that of the stored lens firmware written in the current interchangeable lens 101.

FIG. 2B illustrates the camera display 131 that displays a state of a camera operation used for the user to update the firmware. The camera display 131 displays "firmware update." The user selects "firmware update."

When the user selects the "firmware update," the camera CPU 122 reads all of three types of firmware update data (accessory firmwares A and B, and lens firmware C) stored in the external memory 134. The information of the read firmware update data contains data identification information representing whether the data is used for the interchangeable lens 101 or the lens accessory 110, and firmware version information, etc. The camera CPU 122 transmits the firmware update confirmation command (confirmation information) to the lens CPU 102 via the communication terminals 125 and 104. The firmware update confirmation command contains information of the three types of previously read firmware update data.

The CPU 102 that has received the firmware update confirmation command determines, through the firmware determiner 116, the firmware update data that enables the lens firmware stored in the internal flash memory in the lens CPU 102 to be updated. The lens updatable data information as the determination result by the firmware determiner 116 is transmitted to the camera CPU 122 via the communication terminals 125 and 104. Now assume that the firmware determiner 116 determines the lens firmware C to be firmware update data that enables the lens firmware stored in the unillustrated internal flash memory to be updated.

The lens CPU 102 sends the firmware update confirmation command to the accessory CPU 120 via the communication terminals 117 and 118, when the firmware determiner 116 recognizes the lens accessory firmware data through the firmware update confirmation command. This firmware update confirmation command contains version information of the firmware.

The accessory CPU 120 that has received firmware update confirmation command confirms, through the firmware determiner 121, the firmware stored in the flash memory 119, and determines the firmware update data that enables the stored firmware to be updated. The accessory updatable data information as the determination result is sent to the lens CPU 102 via the communication terminals 117 and 118. The accessory updatable data information sets a final transmission destination to the camera CPU 122. Now assume that the accessory CPU 120 receives the information of the accessory firmwares A and B by the firmware update confirmation command, and determines, through the firmware determiner 121, that only the accessory firmware A is the firmware update data that enables the accessory firmware B stored in the flash memory 119 to be updated.

The lens CPU 102 receives accessory updatable data information (accessory firmware A) from the accessory CPU 120. The lens CPU 102 transmits the accessory updatable data information to the camera CPU 122 via the communication terminals 125 and 104.

The camera CPU 122 that has received the accessory and lens updatable data information from the lens CPU 102 displays, as illustrated in FIG. 2C, the "accessory firmware A" and the "lens firmware C" that can be updated on the camera display 131 so that the user can select them.

Assume that the user selects the "accessory firmware A" displayed on the camera display 131 in this embodiment so as to update the firmware of the lens accessory 110. When the user selects the "accessory firmware A," the camera CPU 122 reads the accessory firmware A from the external memory 134 and transmits data of the accessory firm A to the lens CPU 102 via the communication terminals 125 and 104.

The firmware determiner 116 in the lens CPU 102 determines data identification information (predetermined value) stored in the top address in the accessory firmware A transmitted from the camera CPU 122. As a result of this process, when the received firmware is firmware update data for the lens accessory 110, the lens CPU 102 transmits the accessory firmware A to the accessory CPU 120 via the communication terminals 117 and 118. The data identification information of, for example, "01" means lens firmware for the interchangeable lens (lens apparatus), and the data identification information of "02" means accessory firmware for the lens accessory. This is merely illustrative, and any values may be used as long as the lens firmware and the accessory firmware can be identified.

The accessory CPU 120 updates (overwrites) the accessory firmware B in the flash memory 119 with the accessory firmware A when receiving the accessory firmware A from the lens CPU 102.

The accessory CPU 120 transmits the firmware update end information to the lens CPU 102 via the communication terminals 117 and 118, after the update of the accessory firmware in the flash memory 119 is completed. The lens CPU 102 that has received the firmware update end information transmits the firmware update end information to the camera CPU 122 via the communication terminals 125 and 104. Thereby, the update of the firmware for the lens accessory 110 by the camera CPU 122 is completed.

A description will be given of a firmware update process described above, with reference to a flowchart in FIG. 3. The update process is executed by the camera CPU 122, the lens CPU 102 and the accessory CPU 120 in accordance with the firmware update program (data update program) as a computer program stored in these CPUs.

In the step S101, when the user selects the "firmware update," the camera CPU 122 reads information out of the external memory 134 in the step S102. In the step S103, the camera CPU 122 sends the firmware update confirmation command to the lens CPU 102.

In the step S104, the lens CPU 102 (firmware determiner 116) that has received the firmware update confirmation command determines the firmware update data. In the step S105, when the lens CPU 102 determines that the firmware update data indicated in the firmware update confirmation command is the accessory firmware, the flow moves to the step S106.

In the step S106, the lens CPU 102 transmits the firmware update confirmation command to the accessory CPU 120. In the step S107, the accessory CPU 120 (firmware determiner 121) determines the firmware update data that enables the stored accessory firmware to be updated among the accessory firmwares (accessory firmwares A and B in the above example) indicated in the firmware update confirmation command from the lens CPU 102. In the step S108, the accessory CPU 120 transmits to the lens CPU 102, the accessory updatable data information (accessory firmware A in the above example) representing the firmware update data that enables the stored accessory firmware to be updated.

Next, in the step S109, the lens CPU 102 transmits the accessory updatable data information received from the accessory CPU 120 to the camera CPU 122. In response, in the step S110, the camera CPU 122 displays, on the camera display 131, the firmware update data for the accessory ("accessory firm A" illustrated in FIG. 2C) corresponding to the accessory updatable data information from the lens accessory 110.

Next, in the step S111, when the user selects accessory firmware (corresponding to the accessory updatable data information) displayed on the camera display 131, the camera CPU 122 reads the accessory firmware out of the external memory 134 in the step S112. Then, the camera CPU 122 transmits it to the lens CPU 102.

In the step S113, when the lens CPU 102 (firmware determiner 116) determines that the received accessory firmware is the data for the lens accessory based on the data identification information in the top address, the lens CPU 102 transmits the accessory firmware to the accessory CPU 120. In the step S114, the accessory CPU 120 rewrites the firmware with the received accessory firmware (overwrites and updates the stored accessory firmware).

In the step S115, the accessory CPU 120 confirms that the firmware data rewrite is completed, and the accessory CPU 120 transmits the firmware update end information to the lens CPU 102 in the step S116. Finally, in the step S117, the lens CPU 102 transmits to the camera CPU 122 the firmware update end information representing that the lens accessory 110 has completed updating the firmware data. Thus, the firmware update process of the lens accessory 110 is completed.

When the lens CPU 102 determines that the firmware update data indicated in the firmware update confirmation command is not the accessory firmware in the step S105, the flow moves to the step S118. In the step S118, the lens CPU 102 determines whether or not the firmware update data indicated in the firmware update confirmation command is the lens firmware. When it is not determined to be the lens firmware for some reasons, such as a data failure, the firmware update control is stopped. An error message may be also displayed on the camera display 131. When it is determined to be the lens firmware in the step S118, the lens CPU 102 transmits, to the camera CPU 122 in the step S119, the lens updatable data information indicating that it is the firmware update data with which the interchangeable lens 101 can update the stored firmware. In the step S120, the camera CPU 122 displays, on the camera display 131, information of the firmware update data (lens firmware) corresponding to the lens updatable data information received from the lens CPU 102.

The subsequent steps S121 to S125 are similar to the steps S111, S112, S114, S115, and S117, except the lens firmware is received and transmitted between the camera and lens CPUs 122 and 102, and the lens CPU 102 updates the lens firmware.

As described, according to this embodiment, the firmware determiner 116 in the interchangeable lens 101 determines (confirms) whether the firmware update data sent from the camera CPU 122 is the accessory firmware. When it is determined to be the accessory firmware, the lens CPU 102 receives the accessory firmware from the camera CPU 122 and sends it to the accessory CPU 120. This configuration enables the camera body 130 to update the firmware of the lens accessory 110 that is connected to the interchangeable lens 101 but is not directly connected to the camera body 130.

This embodiment previously stores firmware update data for the accessory 110 and the interchangeable lens 101 in the external memory 134 attached to the camera body 130, and the camera CPU 122 reads the firmware update data out of the external memory 134. However, the camera body 130 (camera CPU 122) may obtain the data identification information of the firmware update data stored in the network, such as the Internet, and sends it to the lens CPU 102. When the firmware update data is determined to be the accessory firmware, the accessory firmware is taken from the network and sent to the accessory CPU 120 via the lens CPU 102.

This embodiment determines whether the accessory firmware is the lens firmware, before the camera CPU 122 transmits the firmware update date to the lens CPU 102. Alternatively, after the camera CPU 122 sends the firmware update data to the lens CPU 102, whether or not the accessory firmware is the lens firmware may be determined. If it is the accessory firmware, this may be sent to the accessory CPU 120.

Second Embodiment

Next follows a firmware update method for the lens accessory 110 according to a second embodiment of the present invention. The basic configurations of the camera body 130, the interchangeable lens 101, and the lens accessory 110 are the same as those in the first embodiment, and elements having common and similar functions will be designated by the same reference numerals as those in the first embodiment.

In this embodiment, various types of firmware data stored in the external memory 134 in the camera body 130 are the same as those in the first embodiment.

When the lens accessory 110 is attached to the interchangeable lens 101 attached to the camera body 130, the lens CPU 102 detects the attachment of the lens accessory 110 to the interchangeable lens 101 via the communication terminals 117 and 118. Thereafter, the lens CPU 102 changes lens ID (first lens identification information) indicating a machine type of the interchangeable lens 101 among the "characteristic information" as the unique information of the interchangeable lens 101, into new lens ID indicating that the lens accessory 110 is attached to the interchangeable lens 101. This new lens ID will be referred to as accessory attached lens ID (second lens identification information). The lens CPU 102 sends the accessory attached lens ID to the camera CPU 122 via the communication terminals 125 and 104. The lens CPU 102 serves as an identification information updater.

Figure 4:
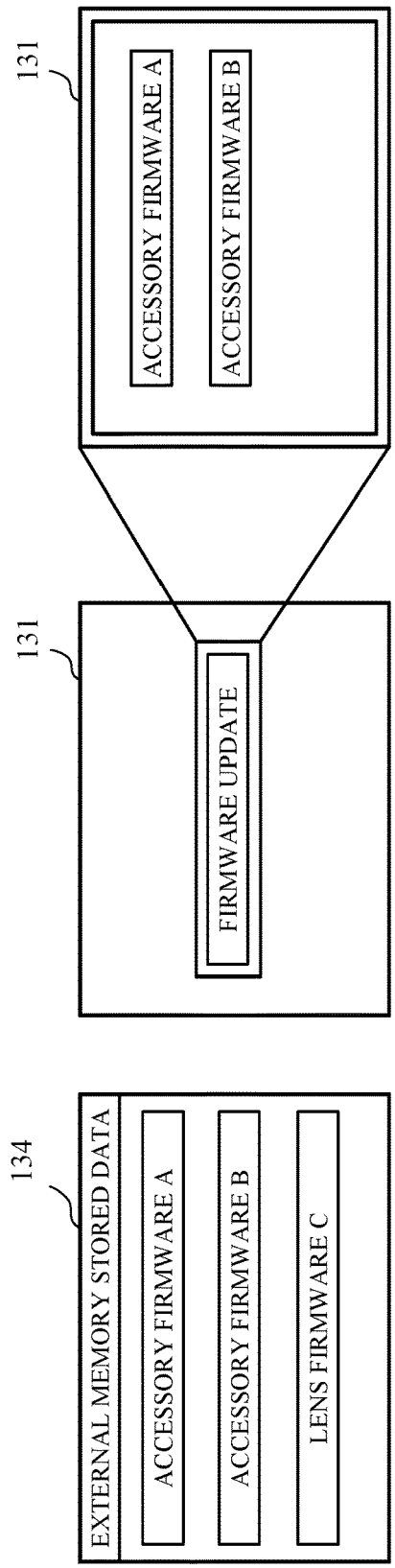
FIGS. 4A to 4C are views illustrating a firmware update UI in an image capturing system according to a second embodiment.

FIG. 4A illustrates various types of firmware update data stored in the external memory 134. The stored data is the same as that illustrated in FIG. 2A. In FIG. 4B, when the user selects the "firmware update," the camera CPU 122 reads all information of the three types of firmware update data (accessory firmwares A and B and the lens firmware C) stored in the external memory 134. The information of the read firmware update data contains data identification information configured to determine whether the data is used for the interchangeable lens 101 or the lens accessory 110, and the version information of the firmware.

The camera CPU 122 receives and confirms the accessory attached lens ID from the lens CPU 102. The camera CPU 122 confirms the accessory attached lens ID, and make selectable only the "accessory firmware A" and the "accessory firmware B" as the firmware update data for the lens accessory 110 on the camera display 131.

At this time, the lens CPU 102 that has received from the accessory CPU 120 version information of the accessory firmware (accessory firmware B) written in the current lens accessory 110 may send the version information to the camera CPU 122. The camera CPU 122 may confirm the version information of the accessory firmware, and display only the accessory firmware (accessory firmware A) having a different (or newer) version on the camera display 131. Only the latest version of the accessory firmware stored in the external memory 134 may be displayed.

Assume that the user selects the "accessory firmware A" displayed on the camera display 131 in this embodiment. When the user select it, the camera CPU 122 reads the accessory firmware A from the external memory 134, and sends it to the lens CPU 102 via the communication terminals 125 and 104. The lens CPU 102 that has received the accessory firmware A sends the accessory firmware A to the accessory CPU 120 via the communication terminals 117 and 118. The accessory CPU 120 that has received the accessory firmware A overwrites and updates the accessory firmware B in the flash memory 119 with the accessory firmware A.

The accessory CPU 120 that has completed updating the accessory firmware sends the firmware update end information to the lens CPU 102 via the communication terminals 117 and 118. In response to the firmware update end information, the lens CPU 102 sends the firmware update end information to the camera CPU 122 via the communication terminals 125 and 104. Thereby, the firmware update of the lens accessory 110 is completed.

Figure 5:
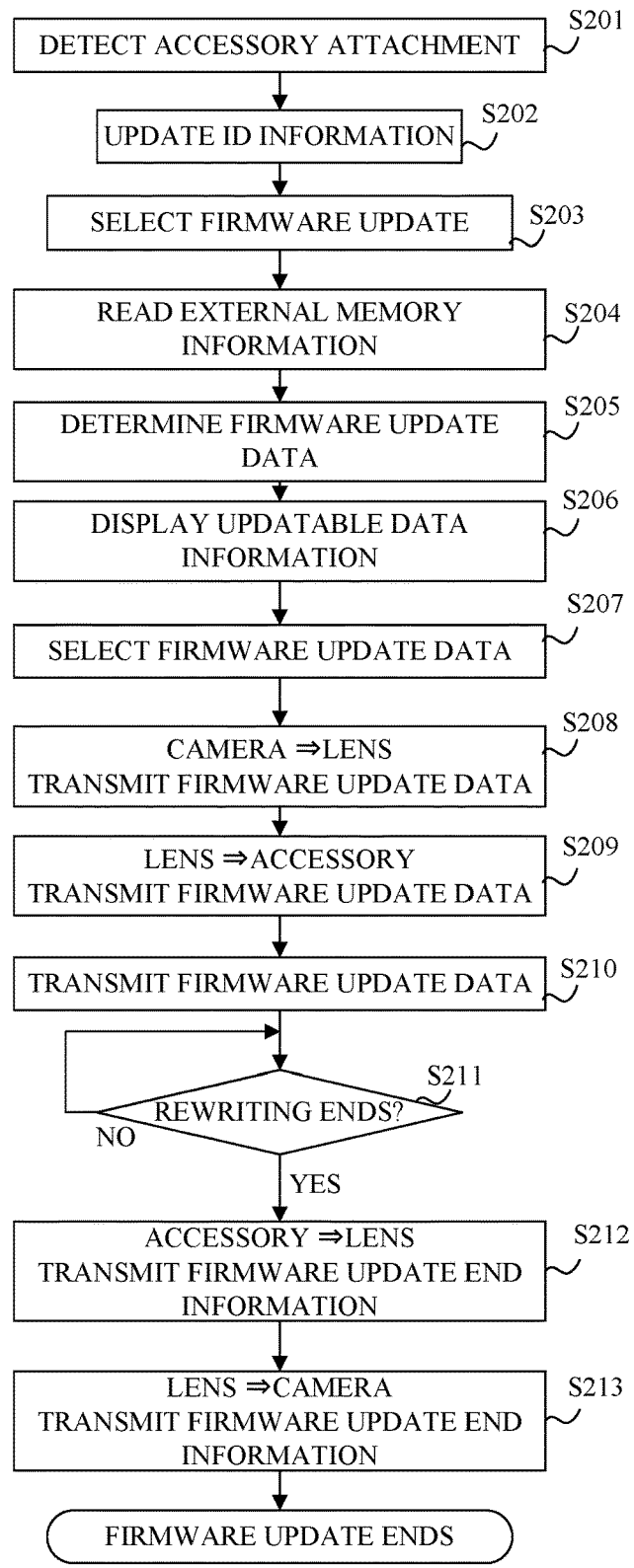
FIG. 5 is a flowchart of a firmware update process according to the second embodiment.

A description will be given of the thus described firmware update process, with reference to a flowchart in FIG. 5. This update process is executed by the camera CPU 122, the lens CPU 102, and the accessory CPU 120 in accordance with the firmware update program (data update program) as the computer program stored in these CPUs.

In the step S201, when the lens CPU 102 detects the attachment of the lens accessory 110, the lens CPU 102 updates its ID information into the accessory attached lens ID in the step S202. The accessory attached lens ID is transmitted to the camera CPU 122.

In the step S203, when the user selects the "firmware update," the camera CPU 122 reads information of the firmware update data in the external memory 134 in the step S204. In the step S205, the camera CPU 122 confirms the accessory attached lens ID, determines the accessory firmware in the external memory 134, and displays information of the updatable accessory firmware on the camera display 131 in the step S206.

Figure 3:
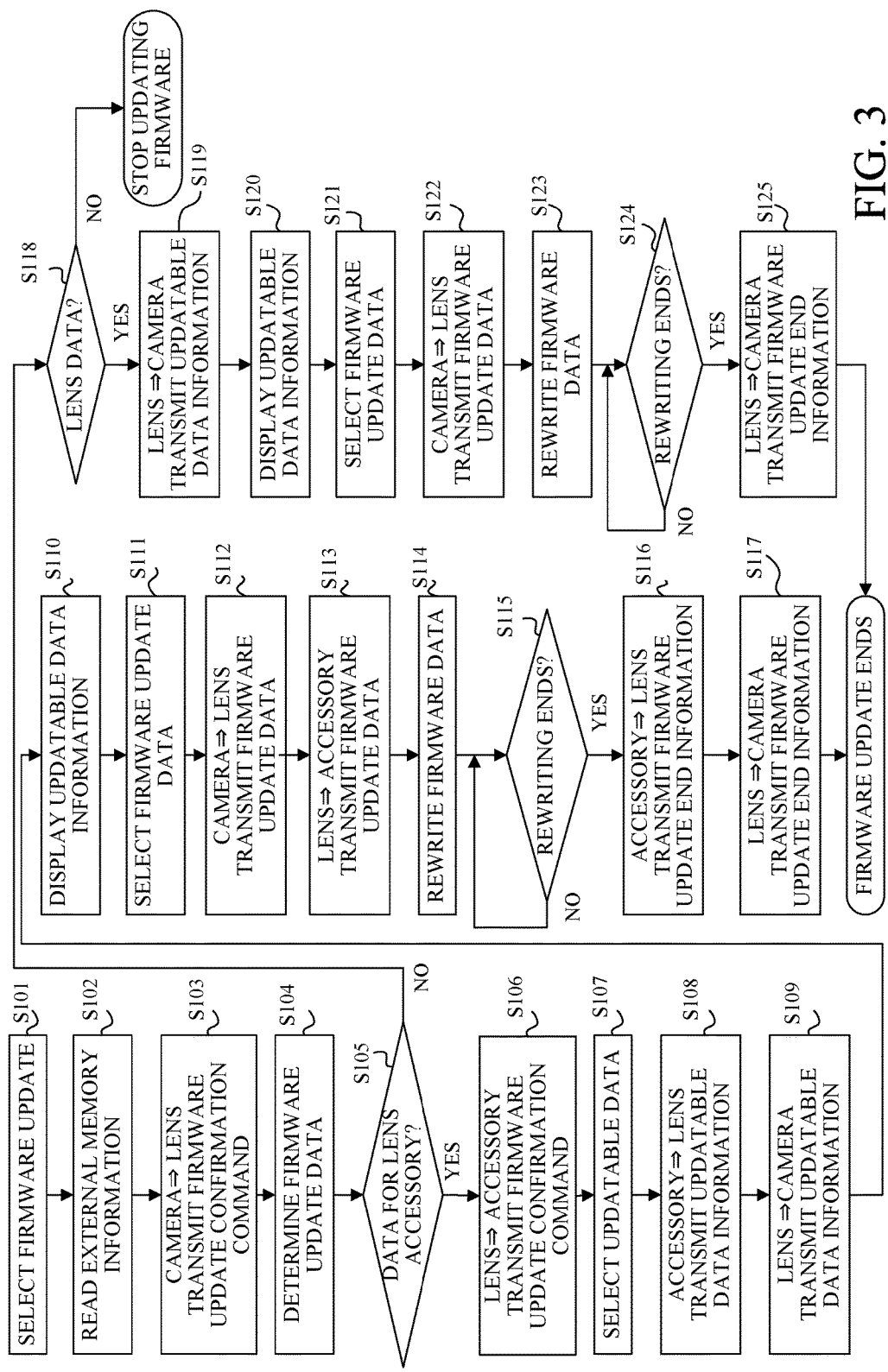
FIG. 3 is a flowchart of a firmware update process according to the first embodiment.

Since the subsequent steps S207 to S213 are similar to the steps S111 to S117 in FIG. 3 in the first embodiment, a description thereof will be omitted.

As described above, this embodiment changes the lens ID of the interchangeable lens 101 into the accessory attached lens ID indicative of the attachment of the lens accessory 110 when the lens accessory 110 is attached to the interchangeable lens 101. The changed accessory attached lens ID is sent to the camera CPU 122. This configuration can limit the firmware update data transmitted from the camera CPU 122 to the lens CPU 102 and the accessory CPU 120, only to the firmware update data for the lens accessory. As a result, the firmware of the lens accessory 110 can be surely updated.

According to each of the above embodiments, the image capturing apparatus can rewrite data stored in the accessory that is not connected to the image capturing apparatus but is connected to the lens apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-246312, filed Dec. 17, 2015 which is hereby incorporated by reference herein in its entirety.

What is claimed is:

1. A lens apparatus attachable to and detachable from an image capturing apparatus and configured to communicate with the image capturing apparatus and an accessory being attachable to and detachable from the lens apparatus, the lens apparatus comprising:
a determiner configured to determine whether update data is used for the lens apparatus or the accessory, the update data being transmittable from the image capturing apparatus and used to update stored data stored in the lens apparatus or the accessory; and
a controller configured to transmit the update data, to the accessory, received from the image capturing apparatus when the determiner determines that the update data is used for the accessory.

2. The lens apparatus according to claim 1, wherein the determiner receives, from the image capturing apparatus, confirmation information used to determine whether the update data is used for the lens apparatus or the accessory, and determines, based on the confirmation information, whether the update data is used for the lens apparatus or the accessory.

3. The lens apparatus according to claim 1, wherein the determiner determines whether the update data is used for the lens apparatus or the accessory, based on data identification information that is information contained in the update data and indicates that the update information is used for the lens apparatus or the accessory.

4. The lens apparatus according to claim 1, wherein the controller receives updatable data information indicating the update date updatable among the stored data stored in the accessory, and transmits the updatable data information to the image capturing apparatus.

* * * * *